United States Patent
Wang et al.

(10) Patent No.: US 10,609,630 B2
(45) Date of Patent: Mar. 31, 2020

(54) DISCOVERY MESSAGE PROCESSING METHOD AND APPARATUS

(71) Applicant: Huawei Technologies Co., Ltd., Shenzhen, Guangdong (CN)

(72) Inventors: Ting Wang, Shanghai (CN); Yuanjie Li, Shanghai (CN); Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/976,642

(22) Filed: May 10, 2018

(65) Prior Publication Data

US 2018/0262976 A1    Sep. 13, 2018

Related U.S. Application Data

(63) Continuation of application No. PCT/CN2016/105323, filed on Nov. 10, 2016.

(30) Foreign Application Priority Data

Nov. 11, 2015   (CN) .......................... 2015 1 0767957

(51) Int. Cl.
*H04W 48/16* (2009.01)
*H04W 8/08* (2009.01)
*H04W 8/00* (2009.01)
*H04W 24/02* (2009.01)
*H04W 64/00* (2009.01)

(52) U.S. Cl.
CPC ........... *H04W 48/16* (2013.01); *H04W 8/005* (2013.01); *H04W 8/08* (2013.01); *H04W 24/02* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2013/0070660 | A1 | 3/2013 | Xu |
| 2014/0056220 | A1 | 2/2014 | Poitau et al. |
| 2015/0156750 | A1 | 6/2015 | Quan et al. |
| 2015/0365897 | A1 | 12/2015 | Hu et al. |
| 2018/0359790 | A1* | 12/2018 | Ingale ................ H04W 8/24 |

FOREIGN PATENT DOCUMENTS

| | | |
|---|---|---|
| CN | 101499847 A | 8/2009 |
| CN | 101534540 A | 9/2009 |
| CN | 101594672 A | 12/2009 |
| CN | 101873165 A | 10/2010 |

(Continued)

*Primary Examiner* — Kouroush Mohebbi
(74) *Attorney, Agent, or Firm* — Conley Rose, P.C.

(57) ABSTRACT

This disclosure discloses a discovery message processing method and apparatus, and pertains to the communications field. The method includes: receiving, by a first wireless network device, a discovery message sent by a second wireless network device; and if the first wireless network device is in an RRC connected state or has an RRC connection requirement, sending, by the first wireless network device, a feedback message corresponding to the discovery message to the second wireless network device. This disclosure can save time-frequency resources.

21 Claims, 11 Drawing Sheets

(56) References Cited

FOREIGN PATENT DOCUMENTS

| | | | |
|---|---|---|---|
| CN | 101883327 | A | 11/2010 |
| CN | 101895981 | A | 11/2010 |
| CN | 103338500 | A | 10/2013 |
| CN | 103338506 | A | 10/2013 |
| CN | 103796296 | A | 5/2014 |
| CN | 104322134 | A | 1/2015 |
| WO | 2015065130 | A1 | 5/2015 |

* cited by examiner

DISCOVERY MESSAGE PROCESSING METHOD AND APPARATUS

CROSS-REFERENCE TO RELATED APPLICATIONS

This application is a continuation of International Application No. PCT/CN2016/105323, filed on Nov. 10, 2016, which claims priority to Chinese Patent Application No. 201510767957.3, filed on Nov. 11, 2015. The disclosures of the aforementioned applications are hereby incorporated by reference in their entireties.

TECHNICAL FIELD

This disclosure relates to the communications field, and in particular, to a discovery message processing method and apparatus.

BACKGROUND

As communications technologies rapidly develop, a mobile terminal is more widely used. Generally, abase station and a terminal need to periodically perform information synchronization and public radio resource configuration.

One synchronization cycle includes a discovery message period and a public message period. The base station sends a discovery message and a public message respectively in the discovery message period and the public message period. The discovery message is a message that is sent by the base station to the terminal and that carries synchronization information, and the public message is a message that is sent by the base station to the terminal and that carries public radio resource configuration information. In an information synchronization process, the base station usually sends different discovery messages in different directions (each direction corresponds to one cell or beam) in adjacent sub-periods in a discovery message period of a synchronization cycle, and a discovery message may carry identification information, so as to distinguish the different discovery messages. Each time receiving a discovery message, the terminal determines whether the signal strength of the discovery message is greater than a specific threshold, and if yes, the terminal sends, to the base station, a feedback message that carries identification information of the discovery message. For a discovery message, if the base station receives a feedback message corresponding to the discovery message sent by at least one terminal, the base station sends, in a corresponding sub-period of the public message period, a subsequent message corresponding to the discovery message or a beam.

In an implementation process of this disclosure, the inventor finds that the prior art has the following disadvantages:

After receiving discovery messages, some terminals without a communications network access requirement send feedback messages to the base station, and the base station still sends a corresponding subsequent message. Consequently, time-frequency resources are wasted.

SUMMARY

To resolve a prior-art problem, embodiments of this disclosure provide a discovery message processing method and apparatus. The technical solutions are as follows:

A first aspect provides a discovery message processing method, where the method includes:

receiving a discovery message sent by a second wireless network device; and if the first wireless network device is in an RRC connected state or has an RRC connection requirement, sending a feedback message corresponding to the discovery message to the second wireless network device.

The discovery message may carry synchronization information sent by the second wireless network device. Having the RRC connection requirement may be a state in which the first wireless network device in an RRC idle state is to send uplink data or receives a paging (paging) message. The RRC connected state may be represented as an RRC_CONNECTED mode (connected mode) or an active state. The RRC idle state may be represented as an RRC_IDLE mode (idle mode) or an idle state. The RRC_IDLE mode (idle mode) and the RRC_CONNECTED mode (connected mode) may be states of a wireless network device in an existing communications protocol.

The second wireless network device may send, in a discovery message period of each synchronization cycle in a beam manner according to a preset synchronization cycle, a discovery message to each cell or beam served by the second wireless network device. If the first wireless network device is in signal coverage of the second wireless network device, and an antenna of the first wireless network device can continuously receive a signal, the first wireless network device may search for and receive a discovery message that is broadcast by the second wireless network device to the outside. If the first wireless network device is in the RRC connected state or has the RRC connection requirement, the first wireless network device may send the feedback message to the second wireless network device in a sub-period in which an uplink resource is configured in a current synchronization cycle, so that the second wireless network device learns that the first wireless network device in the RRC connected state or having the RRC connection requirement exists in a direction corresponding to a beam in which the discovery message is located, that is, learns that a public message sending requirement exists in the direction in which the beam is located. In addition, if the first wireless network device is not in the RRC connected state or has no RRC connection requirement, the first wireless network device does not send the feedback message corresponding to the discovery message to the second wireless network device.

With reference to the first aspect, in a first possible implementation of the first aspect, the receiving a discovery message sent by a second wireless network device includes:

receiving the discovery message sent by the second wireless network device, and obtaining identification information carried in the discovery message or time domain location information of the discovery message; and the sending a feedback message corresponding to the discovery message to the second wireless network device if the first wireless network device is in an RRC connected state or has an RRC connection requirement includes:

if the first wireless network device is in the RRC connected state or has the RRC connection requirement, sending, to the second wireless network device, a feedback message carrying the identification information; or if the first wireless network device is in the RRC connected state or has the RRC connection requirement, sending a feedback message corresponding to the time domain location information to the second wireless network device.

The identification information may be information used to identify different beams corresponding to different cells or a same cell. The time domain location information may be a sub-period corresponding to the discovery message.

If the first wireless network device is in the RRC connected state or has the RRC connection requirement, and successfully receives the discovery message, the first wireless network device may determine a sequence of the feedback message or a feedback sub-period of the feedback message according to the identification information or the time domain location information of the discovery message, so as to generate the feedback message corresponding to the discovery message. Then the first wireless network device may send the feedback message to the second wireless network device in the sub-period in which an uplink resource is configured in the current synchronization cycle.

In this way, the second wireless network device may determine, according to the identification information or the time domain location information, a cell or beam in which the first wireless network device is located, so as to perform subsequent processing on the beam or cell.

With reference to the first aspect or the first possible implementation of the first aspect, in a second possible implementation of the first aspect, the method further includes:

receiving a processing cycle configuration message sent by the second wireless network device, where the processing cycle configuration message carries a target processing cycle, and the target processing cycle is an integer multiple of a synchronization cycle; and setting that the first wireless network device processes, only once in each target processing cycle, a discovery message received in a synchronization cycle.

The target processing cycle may be an integer multiple of the synchronization cycle, such as two times or three times.

The second wireless network device may configure the target processing cycle for the first wireless network device, that is, set that the first wireless network device processes a discovery message of one cycle at an interval of multiple synchronization cycles, and the target processing cycle may be an integer multiple of the synchronization cycle. Further, the second wireless network device may generate the processing cycle configuration message, add the target synchronization cycle to the processing cycle configuration message, and then send the processing cycle configuration message to the first wireless network device. After receiving the foregoing processing cycle configuration message, the first wireless network device may obtain the target processing cycle carried in the processing cycle configuration message. Further, the first wireless network device may process a discovery message in only one synchronization cycle in each target processing cycle.

In this way, the first wireless network device does not need to perform feedback for a discovery message in each synchronization cycle, and a feedback message received by the second wireless network device in each synchronization cycle can be accordingly reduced, so that processing resources of the first wireless network device and the second wireless network device can be saved.

With reference to the first aspect or the first to the second possible implementations of the first aspect, in a third possible implementation of the first aspect, the sending a feedback message corresponding to the discovery message to the second wireless network device if the first wireless network device is in an RRC connected state or has an RRC connection requirement includes:

if the first wireless network device is in the RRC connected state or has the RRC connection requirement, sending, in a preset normal feedback sub-period in a current synchronization cycle, the feedback message corresponding to the discovery message to the second wireless network device.

If the first wireless network device is not in the RRC connected state or has no RRC connection requirement, the first wireless network device does not send the feedback message to the second wireless network device after receiving the discovery message. If the first wireless network device enters the RRC connected state or has the RRC connection requirement, the first wireless network device sends, in the preset normal feedback sub-period in the current synchronization cycle, the feedback message corresponding to the discovery message to the second wireless network device.

With reference to the first aspect or the first to the third possible implementations of the first aspect, in a fourth possible implementation of the first aspect, the method further includes:

receiving a resource configuration message sent by the second wireless network device, where the resource configuration message carries an additional feedback sub-period in a synchronization cycle; and in the current synchronization cycle, if the first wireless network device enters the RRC connected state or has the RRC connection requirement, sending, in a closest additional feedback sub-period after the first wireless network device enters the RRC connected state or has the RRC connection requirement, the feedback message corresponding to the discovery message to the second wireless network device.

The second wireless network device may temporarily set a sub-period in the synchronization cycle to the additional feedback sub-period based on a time-frequency resource usage status, and send, to the first wireless network device, the resource configuration message carrying the additional feedback sub-period. After receiving the resource configuration message, the first wireless network device may obtain the additional feedback sub-period in the synchronization cycle carried in the resource configuration message, and store the additional feedback sub-period. If the first wireless network device is not in the RRC connected state or has no RRC connection requirement, the first wireless network device does not send the feedback message to the second wireless network device after receiving the discovery message. If the first wireless network device enters the RRC connected state or has the RRC connection requirement in a synchronization cycle, the first wireless network device may determine a closest additional feedback sub-period in the current synchronization cycle after the first wireless network device enters the RRC connected state or has the RRC connection requirement, and may send, in the additional feedback sub-period, the feedback message corresponding to the discovery message to the second wireless network device.

In this way, after entering the RRC connected state or having the RRC connection requirement, the first wireless network device may send the feedback message in the closest additional feedback sub-period without long-time waiting, so that a feedback delay of the first wireless network device can be reduced.

With reference to the first aspect or the first to the third possible implementations of the first aspect, in a fifth possible implementation of the first aspect, the method further includes:

in the current synchronization cycle, if the first wireless network device enters the RRC connected state or has the RRC connection requirement, sending, in a closest preset additional feedback sub-period after the first wireless network device enters the RRC connected state or has the RRC connection requirement, the feedback message corresponding to the discovery message to the second wireless network device.

The second wireless network device may set a sub-period in the synchronization cycle other than the preset normal feedback sub-period to a preset additional feedback sub-period, and send, to the first wireless network device, a resource configuration message carrying the preset additional feedback sub-period. After receiving the resource configuration message, the first wireless network device may obtain the preset additional feedback sub-period in the synchronization cycle carried in the resource configuration message, that is, pre-configure a sub-period used for feedback message sending, and store the preset additional feedback sub-period. If the first wireless network device is not in the RRC connected state or has no RRC connection requirement, the first wireless network device does not send the feedback message to the second wireless network device after receiving the discovery message. If the first wireless network device enters the RRC connected state or has the RRC connection requirement in a synchronization cycle, the first wireless network device may detect the preset additional feedback sub-period closest to a current moment in the current synchronization cycle, and may send, in the preset additional feedback sub-period, the feedback message corresponding to the discovery message to the second wireless network device.

In this way, after entering the RRC connected state or having the RRC connection requirement, the first wireless network device may send the feedback message in the closest preset additional feedback sub-period without long-time waiting, so that a feedback delay of the first wireless network device can be reduced.

With reference to the first aspect or the first to the fifth possible implementations of the first aspect, in a sixth possible implementation of the first aspect, the method further includes:

obtaining a received signal strength of the discovery message; and the sending a feedback message corresponding to the discovery message to the second wireless network device if the first wireless network device is in an RRC connected state or has an RRC connection requirement includes:

if the received signal strength is greater than or equal to a preset signal strength threshold, and the first wireless network device is in the RRC connected state or has the RRC connection requirement, sending the feedback message corresponding to the discovery message to the second wireless network device.

The first wireless network device may preset the signal strength threshold, so as to determine whether a cell or beam corresponding to a discovery signal has relatively good quality. When a signal strength of a received discovery message is greater than or equal to the signal strength threshold, the first wireless network device may query whether the first wireless network device is in the RRC connected state or has the RRC connection requirement. If the first wireless network device is in the RRC connected state or has the RRC connection requirement, the first wireless network device sends the feedback message corresponding to the discovery message to the second wireless network device.

In this way, the first wireless network device sends the feedback message corresponding to the discovery message to the second wireless network device, and performs feedback for only a discovery message with a relatively high received signal strength. In this case, the second wireless network device may send a subsequent message to only a corresponding cell or beam according to the feedback message, so that a message subsequently received by the first wireless network device has a relatively high received signal strength, and processing resources of the first wireless network device and the second wireless network device can be saved.

With reference to the sixth possible implementation of the first aspect, in a seventh possible implementation of the first aspect, the receiving a discovery message sent by a second wireless network device includes: receiving multiple discovery messages sent by the second wireless network device in a discovery message period of the current synchronization cycle;

the obtaining a received signal strength of the discovery message includes: obtaining a received signal strength of each discovery message; and the sending the feedback message corresponding to the discovery message to the second wireless network device if the received signal strength is greater than or equal to a preset signal strength threshold, and the first wireless network device is in the RRC connected state or has the RRC connection requirement includes: if the multiple received discovery messages include a discovery message whose received signal strength is greater than or equal to the preset signal strength threshold, and the first wireless network device is in the RRC connected state or has the RRC connection requirement, sending a feedback message corresponding to a discovery message with a highest received signal strength to the second wireless network device.

In a synchronization cycle, if receiving the multiple discovery messages, the first wireless network device may obtain corresponding received signal strengths for receiving the discovery messages. If the multiple received discovery messages include the discovery message whose received signal strength is greater than or equal to the signal strength threshold, it may be determined whether the first wireless network device is in the RRC connected state or has the RRC connection requirement. If the first wireless network device is in the RRC connected state or has the RRC connection requirement, the first wireless network device may select a discovery message with a highest received signal strength from the multiple received discovery messages, and then send, in a last preset normal feedback sub-period in the current synchronization cycle, the feedback message corresponding to the discovery message to the second wireless network device.

In this way, the first wireless network device needs to perform feedback for only one discovery message in each synchronization cycle, and the second wireless network device may send a subsequent message to only one corresponding cell or beam according to a feedback message, so that processing resources of the first wireless network device and the second wireless network device can be saved.

With reference to the seventh possible implementation of the first aspect, in an eighth possible implementation of the first aspect, the sending a feedback message corresponding to a discovery message with a highest received signal strength to the second wireless network device if the multiple received discovery messages include a discovery message whose received signal strength is greater than or equal to the preset signal strength threshold, and the first wireless network device is in the RRC connected state or has the RRC connection requirement includes:

if the multiple received discovery messages include the discovery message whose received signal strength is greater than or equal to the preset signal strength threshold, the first wireless network device is in the RRC connected state or has the RRC connection requirement, and a discovery message with a highest received signal strength in the current synchronization cycle is different from a discovery message with a highest received signal strength in a previous synchronization cycle, sending, to the second wireless network device, a feedback message corresponding to the discovery message received in the current synchronization cycle.

When the first wireless network device is in the RRC connected state or has the RRC connection requirement, if the first wireless network device detects, in a synchronization cycle, that the discovery message with a highest received signal strength in the current cycle is different from the discovery message with a highest received signal strength in the previous synchronization cycle, the first wireless network device may send, in a last preset normal feedback sub-period in the current synchronization cycle, a feedback message corresponding to the discovery message with a highest received signal strength to the second wireless network device. If the first wireless network device detects that the discovery message with a highest received signal strength in the current cycle is the same as the discovery message with a highest received signal strength in the previous synchronization cycle, the first wireless network device may not send the feedback message to the second wireless network device in the current cycle.

In this way, when the cell or beam in which the first wireless network device is located changes, the second wireless network device may be notified in a timely manner, so that the second wireless network device can send a subsequent message to the first wireless network device in a new cell or beam.

With reference to the first aspect or the first to the eighth possible implementations of the first aspect, in a ninth possible implementation of the first aspect, after the sending a feedback message corresponding to the discovery message to the second wireless network device, the method further includes:

receiving a public message that corresponds to the discovery message and that is sent by the second wireless network device.

The public message may include SIB (system information block, system information block) information.

After the first wireless network device sends the feedback message to the second wireless network device, the second wireless network device may learn of, according to identification information carried in the feedback message or time domain location information of the feedback message, a cell or beam in which the first wireless network device is located, so as to determine a sub-period corresponding to the cell or beam in a public message period of the synchronization cycle, and send a corresponding public message in the sub-period. After receiving the public message sent by the second wireless network device, the first wireless network device may perform, according to the SIB information, operations such as public radio resource configuration, communications cell selection and reselection.

A second aspect provides a discovery message processing apparatus, where the apparatus includes:

a first receiving module whose specific function may be implemented by a receiver, configured to receive a discovery message sent by a second wireless network device; and a sending module whose specific function may be jointly implemented by a processor and a transmitter, configured to: if a first wireless network device is in an RRC connected state or has an RRC connection requirement, send a feedback message corresponding to the discovery message to the second wireless network device.

With reference to the second aspect, in a first possible implementation of the second aspect, the first receiving module is configured to:

receive the discovery message sent by the second wireless network device, and obtain identification information carried in the discovery message or time domain location information of the discovery message; and the sending module is configured to:

if the first wireless network device is in the RRC connected state or has the RRC connection requirement, send, to the second wireless network device, a feedback message carrying the identification information; or if the first wireless network device is in the RRC connected state or has the RRC connection requirement, send a feedback message corresponding to the time domain location information to the second wireless network device.

With reference to the second aspect or the first possible implementation of the second aspect, in a second possible implementation of the second aspect, the apparatus further includes:

a second receiving module whose specific function may be implemented by the receiver, configured to receive a processing cycle configuration message sent by the second wireless network device, where the processing cycle configuration message carries a target processing cycle, and the target processing cycle is an integer multiple of a synchronization cycle; and a setting module whose specific function may be implemented by the processor, configured to set that the first wireless network device processes, only once in each target processing cycle, a discovery message received in a synchronization cycle.

With reference to the second aspect or the first to the second possible implementations of the second aspect, in a third possible implementation of the second aspect, the sending module is configured to:

if the first wireless network device is in the RRC connected state or has the RRC connection requirement, send, in a preset normal feedback sub-period in a current synchronization cycle, the feedback message corresponding to the discovery message to the second wireless network device.

With reference to the second aspect or the first to the third possible implementations of the second aspect, in a fourth possible implementation of the second aspect, the apparatus further includes a third receiving module whose specific function may be implemented by the receiver, configured to receive a resource configuration message sent by the second wireless network device, where the resource configuration message carries an additional feedback sub-period in a synchronization cycle; where the sending module is configured to: in the current synchronization cycle, if the first wireless network device enters the RRC connected state or has the RRC connection requirement, send, in a closest additional feedback sub-period after the first wireless network device enters the RRC connected state or has the RRC connection requirement, the feedback message corresponding to the discovery message to the second wireless network device.

With reference to the second aspect or the first to the third possible implementations of the second aspect, in a fifth possible implementation of the second aspect, the sending module is further configured to:

in the current synchronization cycle, if the first wireless network device enters the RRC connected state or has the RRC connection requirement, send, in a closest preset additional feedback sub-period after the first wireless network device enters the RRC connected state or has the RRC connection requirement, the feedback message corresponding to the discovery message to the second wireless network device.

With reference to the second aspect or the first to the fifth possible implementations of the second aspect, in a sixth possible implementation of the second aspect, the apparatus further includes an obtaining module whose specific function may be implemented by the processor, configured to obtain a received signal strength of the discovery message; where the sending module is configured to: if the received signal strength is greater than a preset signal strength threshold, and the first wireless network device is in the RRC connected state or has the RRC connection requirement, send the feedback message corresponding to the discovery message to the second wireless network device.

With reference to the sixth possible implementation of the second aspect, in a seventh possible implementation of the second aspect, the first receiving module is configured to receive multiple discovery messages sent by the second wireless network device in a discovery message period of the current synchronization cycle;

the obtaining module is configured to obtain a received signal strength of each discovery message; and the sending module is configured to: if the multiple received discovery messages include a discovery message whose received signal strength is greater than the preset signal strength threshold, and the first wireless network device is in the RRC connected state or has the RRC connection requirement, send a feedback message corresponding to a discovery message with a highest received signal strength to the second wireless network device.

With reference to the seventh possible implementation of the second aspect, in an eighth possible implementation of the second aspect, the sending module is configured to:

if the multiple received discovery messages include the discovery message whose received signal strength is greater than the preset signal strength threshold, the first wireless network device is in the RRC connected state or has the RRC connection requirement, and a discovery message with a highest received signal strength in the current synchronization cycle is different from a discovery message with a highest received signal strength in a previous synchronization cycle, send, to the second wireless network device, a feedback message corresponding to the discovery message received in the current synchronization cycle.

With reference to the second aspect or the first to the eighth possible implementations of the second aspect, in a ninth possible implementation of the second aspect, the apparatus further includes:

a fourth receiving module whose specific function may be implemented by the receiver, configured to receive a public message that corresponds to the discovery message and that is sent by the second wireless network device.

A third aspect provides a wireless network device, where the wireless network device includes a receiver, a processor, and a transmitter, where the receiver is configured to receive a discovery message sent by a second wireless network device; and the processor is configured to: if a first wireless network device is in an RRC connected state or has an RRC connection requirement, trigger the transmitter to send a feedback message corresponding to the discovery message to the second wireless network device.

With reference to the third aspect, in a first possible implementation of the third aspect, the receiver is specifically configured to: receive the discovery message sent by the second wireless network device; and trigger the processor to obtain identification information carried in the discovery message or time domain location information of the discovery message; and the processor is specifically configured to: if the first wireless network device is in the RRC connected state or has the RRC connection requirement, trigger the transmitter to send, to the second wireless network device, a feedback message carrying the identification information; or the processor is specifically configured to: if the first wireless network device is in the RRC connected state or has the RRC connection requirement, trigger the transmitter to send a feedback message corresponding to the time domain location information to the second wireless network device.

With reference to the third aspect or the first possible implementation of the third aspect, in a second possible implementation of the third aspect, the receiver is further configured to receive a processing cycle configuration message sent by the second wireless network device; and the processor is further configured to set that the first wireless network device processes, only once in each target processing cycle, a discovery message received in a synchronization cycle.

With reference to the third aspect or the first to the second possible implementations of the third aspect, in a third possible implementation of the third aspect, the processor is specifically configured to: if the first wireless network device is in the RRC connected state or has the RRC connection requirement, trigger the transmitter to send, in a preset normal feedback sub-period in a current synchronization cycle, the feedback message corresponding to the discovery message to the second wireless network device.

With reference to the third aspect or the first to the third possible implementations of the third aspect, in a fourth possible implementation of the third aspect, the receiver is further configured to receive a resource configuration message sent by the second wireless network device; and the processor is specifically configured to: in the current synchronization cycle, if the first wireless network device enters the RRC connected state or has the RRC connection requirement, trigger the transmitter to send, in a closest additional feedback sub-period after the first wireless network device enters the RRC connected state or has the RRC connection requirement, the feedback message corresponding to the discovery message to the second wireless network device.

With reference to the third aspect or the first to the third possible implementations of the third aspect, in a fifth possible implementation of the third aspect, the processor is further configured to: in the current synchronization cycle, if the first wireless network device enters the RRC connected state or has the RRC connection requirement, trigger the transmitter to send, in a closest preset additional feedback sub-period after the first wireless network device enters the RRC connected state or has the RRC connection requirement, the feedback message corresponding to the discovery message to the second wireless network device.

With reference to the third aspect or the first to the fifth possible implementations of the third aspect, in a sixth possible implementation of the third aspect, the processor is further configured to: trigger the first wireless network device to obtain a received signal strength of the discovery message; and if the received signal strength is greater than or equal to a preset signal strength threshold, and the first wireless network device is in the RRC connected state or has the RRC connection requirement, trigger the transmitter to send the feedback message corresponding to the discovery message to the second wireless network device.

With reference to the sixth possible implementation of the third aspect, in a seventh possible implementation of the third aspect, the receiver is specifically configured to receive multiple discovery messages sent by the second wireless network device in a discovery message period of the current synchronization cycle; and the processor is specifically configured to: obtain a received signal strength of each discovery message; and if the multiple received discovery messages include a discovery message whose received signal strength is greater than or equal to the preset signal strength threshold, and the first wireless network device is in the RRC connected state or has the RRC connection requirement, trigger the transmitter to send a feedback message corresponding to a discovery message with a highest received signal strength to the second wireless network device.

With reference to the seventh possible implementation of the third aspect, in an eighth possible implementation of the third aspect, the processor is specifically configured to: if the multiple received discovery messages include the discovery message whose received signal strength is greater than or equal to the preset signal strength threshold, the first wireless network device is in the RRC connected state or has the RRC connection requirement, and a discovery message with a highest received signal strength in the current synchronization cycle is different from a discovery message with a highest received signal strength in a previous synchronization cycle, trigger the transmitter to send, to the second wireless network device, a feedback message corresponding to the discovery message received in the current synchronization cycle.

With reference to the third aspect or the first to the eighth possible implementations of the third aspect, in a ninth possible implementation of the third aspect, the receiver is further configured to receive a public message that corresponds to the discovery message and that is sent by the second wireless network device.

The technical solutions provided in the embodiments of this disclosure may include the following beneficial effects:

In the embodiments of this disclosure, the first wireless network device receives the discovery message sent by the second wireless network device. If the first wireless network device is in the RRC connected state or has the RRC connection requirement, the first wireless network device sends the feedback message corresponding to the discovery message to the second wireless network device. In this way, the first wireless network device sends the feedback message to the second wireless network device only when the first wireless network device has a communications network access requirement, so that time-frequency resources can be saved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of this disclosure clearer, the following further describes the implementations of this disclosure in detail with reference to the accompanying drawings.

Figure 14:
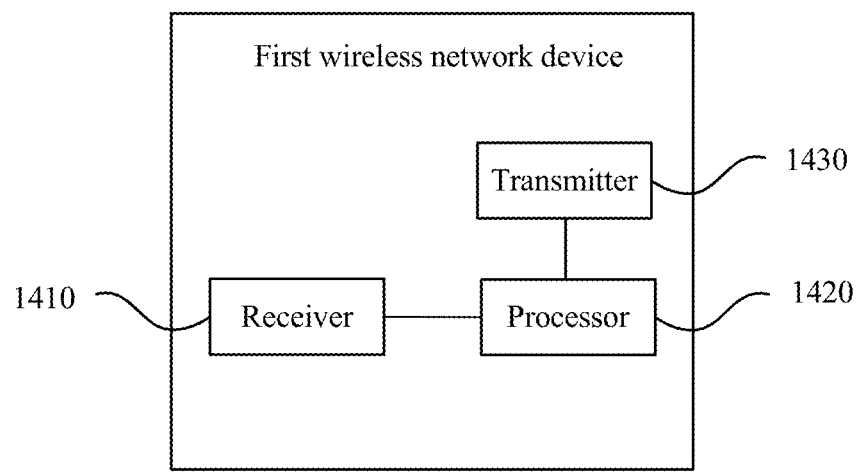
FIG. 14 is a schematic structural diagram of a first wireless network device according to an embodiment of this disclosure.
Figure 15:
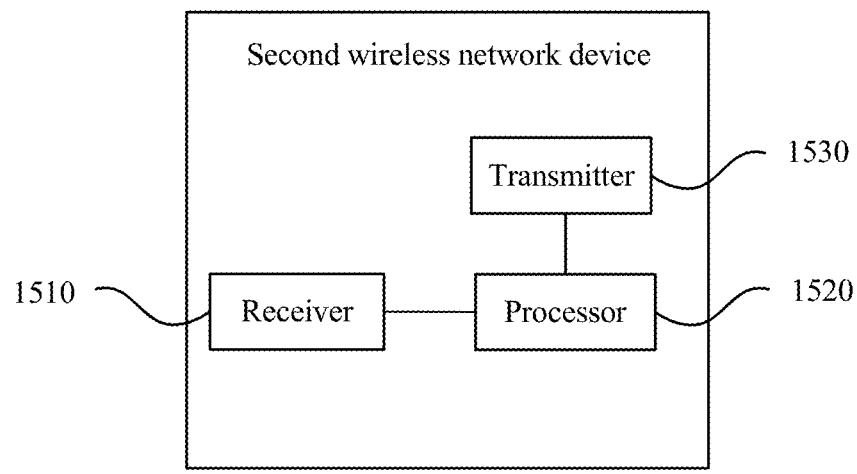
FIG. 15 is a schematic structural diagram of a second wireless network device according to an embodiment of this disclosure.

An embodiment of this disclosure provides a discovery message processing method. The method may be executed by a first wireless network device and a second wireless network device. The first wireless network device may be a base station or user equipment, and may be provided with a receiver 1410, a processor 1420, and a transmitter 1430. As shown in FIG. 14, the receiver 1410 and the transmitter 1430 may be separately connected to the processor 1420. The receiver 1410 may be configured to receive and send a message or data. The receiver 1410 may include but is not limited to an antenna, at least one amplifier, a tuner, one or more oscillators, a coupler, an LNA (low noise amplifier), a duplexer, and the like. The processor 1420 may be a control center of a terminal device, and is connected to all parts such as the receiver 1410 and the transmitter 1430 of the entire terminal device by using various interfaces and lines. In this disclosure, the processor 1420 may be configured to perform related processing of message receiving or sending. Optionally, the processor 1420 may include one or more processing units. The processor 1420 may be a general purpose processor, including a central processing unit (CPU), a network processor (NP), or the like; or may be a digital signal processor (DSP), an application-specific integrated circuit (ASIC), a field-programmable gate array (FPGA), another programmable logic component, or the like. Specifically, a program may include program code, and the program code includes a computer operation instruction. The second wireless network device may be a base station or user equipment, and may be provided with a receiver 1510, a processor 1520, and a transmitter 1530. As shown in FIG. 15, the receiver 1510 and the transmitter 1530 may be separately connected to the processor 1520. The receiver 1510 may be configured to receive and send a message or data. The receiver 1510 may include but is not limited to an antenna, at least one amplifier, a tuner, one or more oscillators, a coupler, an LNA (low noise amplifier), a duplexer, and the like. In this disclosure, the processor 1520 may be configured to perform related processing of message receiving or sending. The processor 1520 may include one or more processing units. The processor 1520 may be a general purpose processor, including a central processing unit (CPU), a network processor (NP), or the like; or may be a digital signal processor (DSP), an application-specific integrated circuit (ASIC), a field-programmable gate array (FPGA), another programmable logic component, or the like. Specifically, a program may include program code, and the program code includes a computer operation instruction. In this embodiment, an example in which the second wireless network device is a base station, and the first wireless network device is a terminal is used to describe the solutions in detail. Another case is similar to this, and details are not repeatedly described in this embodiment.

Figure 1:
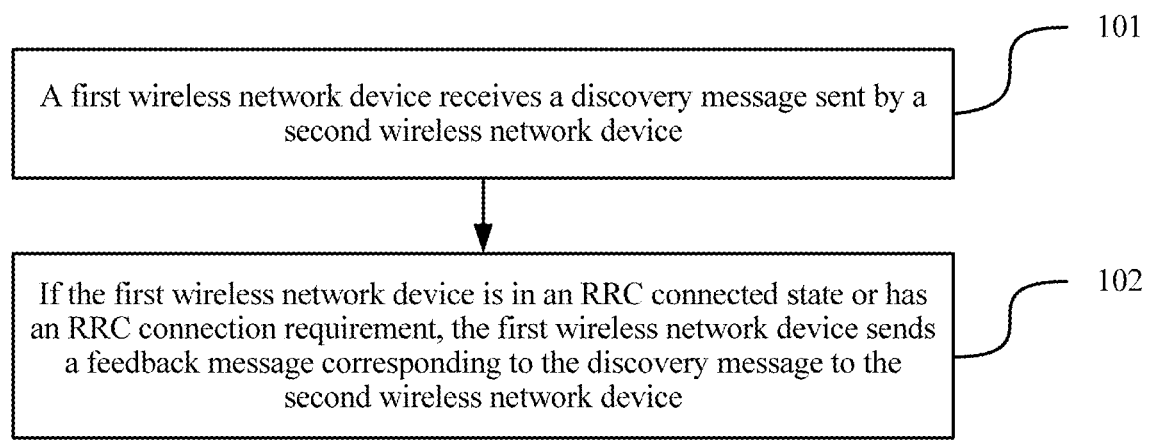
FIG. 1 is a flowchart of a discovery message processing method according to an embodiment of this disclosure.

With reference to a specific implementation, the following describes a processing procedure shown in FIG. 1 in detail, and content may be as follows:

Step 101: A first wireless network device receives a discovery message sent by a second wireless network device.

The discovery message may carry at least one piece of synchronization information (the terminal may perform time domain synchronization and frequency domain synchronization with the base station according to the information) sent by the second wireless network device, information such as a CRS (cell-specific reference signal) and a CSI-RS (channel state information-reference signal), or information related to a PBCH (physical broadcast channel).

Figure 2:
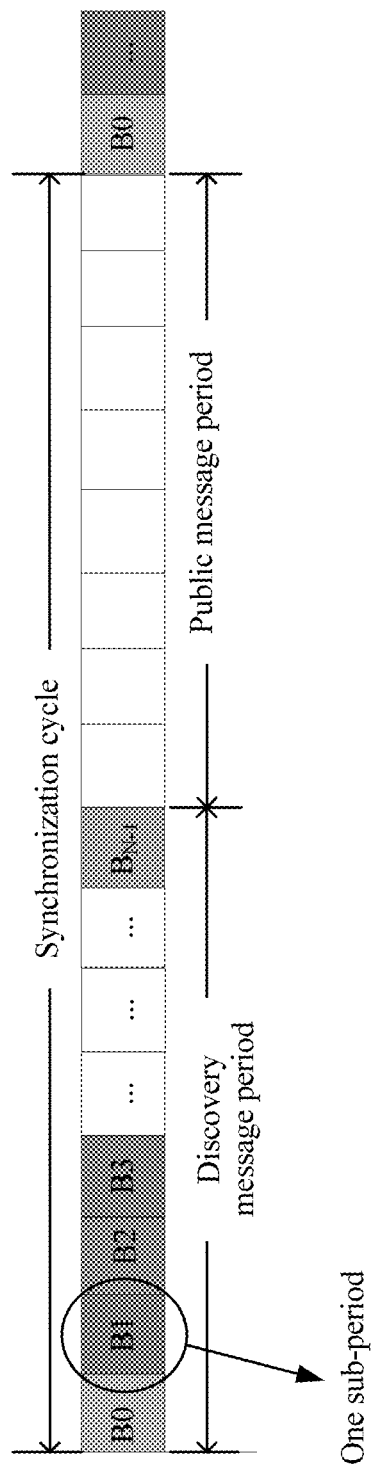
FIG. 2 is a schematic diagram of a synchronization cycle according to an embodiment of this disclosure.

In implementation, the second wireless network device may preset a synchronization cycle, and set an earlier part of each synchronization cycle as a discovery message period, and a later part of each synchronization cycle as a public message period. The discovery message period may be divided into multiple sub-periods, one sub-period may be a communication time unit such as one radio frame, one subframe, or multiple symbols, each sub-period corresponds to one cell or beam served by the second wireless network device, and one cell may include multiple different beams. As shown in FIG. 2, each grid may correspond to one sub-period, and B0, B1, ..., and BN−1 may respectively correspond to different cells or beams. The second wireless network device may send, in a discovery message period of each synchronization cycle in a beam manner according to a preset synchronization cycle, a discovery message to each cell or beam served by the second wireless network device. If the first wireless network device is in signal coverage of the second wireless network device, and an antenna of the first wireless network device can continuously receive a signal, the first wireless network device may search for and receive a discovery message that is broadcast by the second wireless network device to the outside.

Optionally, after receiving the discovery message sent by the second wireless network device, the first wireless network device may obtain identification information carried in the discovery message or time domain location information of the discovery message.

The identification information may be information used to identify different beams corresponding to different cells or a same cell. The time domain location information may be a sub-period corresponding to the discovery message.

In implementation, after receiving the discovery message sent by the second wireless network device, the first wireless network device may parse the discovery message, to obtain the identification information carried in the discovery message. Alternatively, when receiving the discovery message, the first wireless network device may determine, according to a moment at which the discovery message is received, a sub-period corresponding to the discovery message.

Step 102: If the first wireless network device is in an RRC (Radio Resource Control, radio resource control) connected state or has an RRC connection requirement, the first wireless network device sends a feedback message corresponding to the discovery message to the second wireless network device.

Having the RRC connection requirement may be a state in which the first wireless network device in an RRC idle state is to send uplink data or receives a paging (paging) message. The RRC connected state may be represented as an RRC_CONNECTED mode (connected mode) or an active state. The RRC idle state may be represented as an RRC_IDLE mode (idle mode) or an idle state. In a multi-carrier aggregation scenario, the first wireless network device preferably camps on a low frequency cell, and is in the RRC idle state; if the first wireless network device needs to access a high frequency cell, the first wireless network device has the RRC connection requirement.

The RRC_IDLE mode (idle mode) and the RRC_CONNECTED mode (connected mode) may be states of a wireless network device in an existing communications protocol.

In implementation, if the first wireless network device is in the RRC connected state or has the RRC connection requirement, that is, the first wireless network device is to send uplink data or receives a paging message, the first wireless network device may send the feedback message to the second wireless network device in an uplink resource (that is, a normal feedback sub-period, an additional feedback sub-period, or the like described in the following) configured in a current synchronization cycle, and the feedback message corresponds to the foregoing discovery message, that is, the feedback message carries beam identification information carried in the discovery message, or time domain location information of the feedback message corresponds to the time domain location information of the discovery message, so that the second wireless network device learns that the first wireless network device in the RRC connected state or having the RRC connection requirement exists in a direction corresponding to a beam in which the discovery message is located, that is, learns that a public message sending requirement exists in the direction in which the beam is located. In addition, if the first wireless network device is not in the RRC connected state or has no RRC connection requirement, the first wireless network device does not send the feedback message corresponding to the discovery message to the second wireless network device. The first wireless network device can send a message to the second wireless network device in only a sub-period having an uplink resource. Likewise, the second wireless network device can send a message to the first wireless network device in only a sub-period having a downlink resource. The second wireless network device can configure, in one subframe, uplink resources corresponding to multiple beams in the following three manners: A first manner is that configuration is performed on different symbols of a same subframe according to beam identification information; a second manner is that configuration is performed on different subcarriers of a same subframe according to beam identification information; and a third manner is that configuration is performed on a same RE of a same subframe according to sequence code corresponding to a beam.

Optionally, for a case in which the foregoing discovery message carries the identification information, corresponding processing in step 102 may be as follows: If the first wireless network device is in the RRC connected state or has the RRC connection requirement, the first wireless network device sends, to the second wireless network device, a feedback message carrying the identification information.

In implementation, if the first wireless network device is in the RRC connected state or has the RRC connection requirement, and successfully receives the discovery message, the first wireless network device may parse the discovery message, and determine a sequence of the feedback message or a feedback sub-period of the feedback message according to the identification information after obtaining the identification information carried in the discovery message, so as to generate the feedback message corresponding to the discovery message. Then the first wireless network device may send the feedback message to the second wireless network device in the sub-period in which an uplink resource is configured in the current synchronization cycle. After receiving the feedback message, the second wireless network device may determine, according to the identification information carried in the feedback message, a cell or beam corresponding to the feedback message. In this case, the second wireless network device may learn that the first wireless network device in the RRC connected state or having the RRC connection requirement exists in the cell or beam, that is, a public message sending requirement exists in the cell or beam.

In this way, the second wireless network device may determine, according to the identification information, a cell or beam in which the first wireless network device is located, so as to perform subsequent processing on the beam or cell.

Optionally, for a case of obtaining the time domain location information of the discovery message, corresponding processing in step 102 may be as follows: If the first wireless network device is in the RRC connected state or has the RRC connection requirement, the first wireless network device sends a feedback message corresponding to the time domain location information to the second wireless network device.

Figure 3:
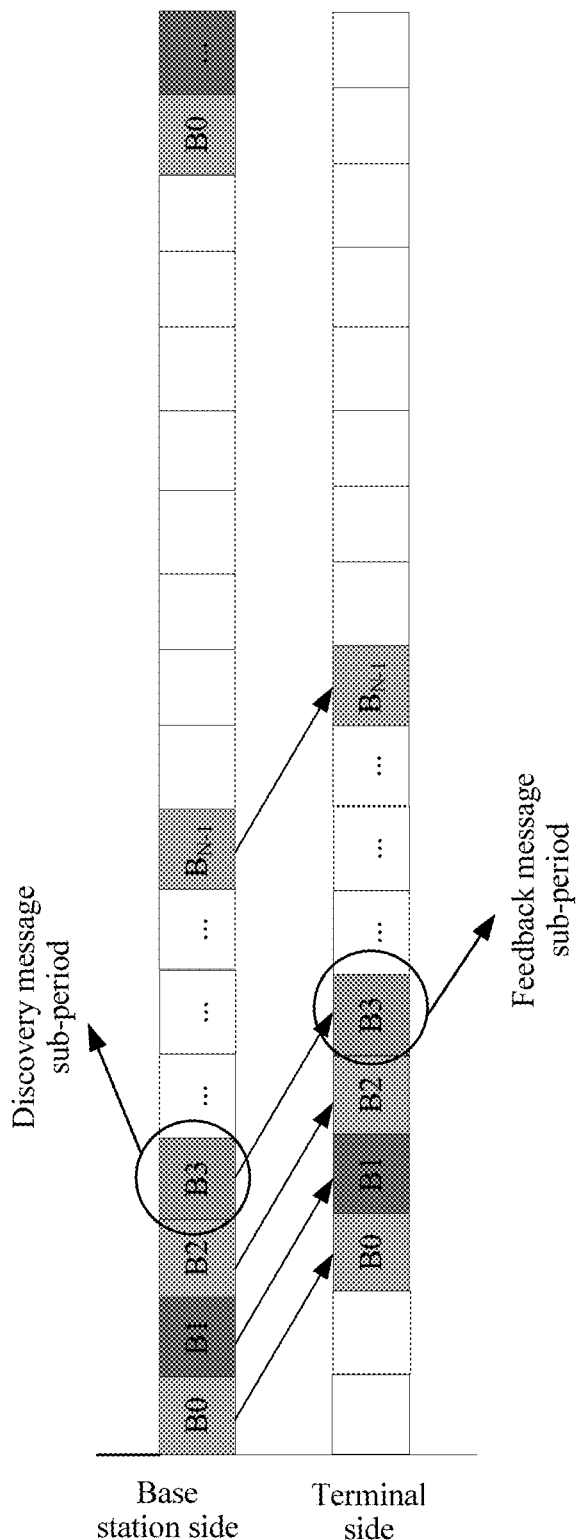
FIG. 3 is a schematic diagram of discovery message processing according to an embodiment of this disclosure.

In implementation, if the first wireless network device is in the RRC connected state or has the RRC connection requirement, and successfully receives the discovery message, the first wireless network device may obtain the time domain location information of the discovery message, so as to determine a sequence of the feedback message or a feedback sub-period of the feedback message based on the time domain location information of the discovery message, or beam identification information corresponding to the time domain location information of the discovery message, thereby generating the feedback message corresponding to the discovery message. Further, the first wireless network device may send the feedback message to the second wireless network device in the determined feedback sub-period of the feedback message. As shown in FIG. 3, a feedback sub-period of a feedback message corresponding to time domain location information of a discovery message sent by a second wireless network device side in a sub-period B0 may be a sub-period B0 on a first wireless network device side. When receiving the feedback message in a corresponding sub-period, the second wireless network device may determine a cell or beam corresponding to the sub-period. In this case, the second wireless network device may learn that the first wireless network device in the RRC connected state or having the RRC connection requirement exists in the cell or beam, that is, a public message sending requirement exists in the cell or beam.

In this way, the second wireless network device may determine, according to the time domain location information, a cell or beam in which the first wireless network device is located, so as to perform subsequent processing on the beam or cell.

Likewise, the first wireless network device may also determine the time domain location information of the discovery message according to the identification information carried in the discovery message, so as to send the feedback message corresponding to the time domain location information of the discovery message to the second wireless network device.

Optionally, the first wireless network device may perform feedback once in multiple synchronization cycles, and corresponding processing may be as follows: The first wireless network device receives a processing cycle configuration message sent by the second wireless network device, where the processing cycle configuration message carries a target processing cycle; and sets that the first wireless network device processes, in each target processing cycle, a discovery message received in only one synchronization cycle.

The target processing cycle may be an integer multiple of the synchronization cycle, such as two times or three times. The processing cycle configuration message may be a message that is sent by the second wireless network device at any moment in a synchronization cycle and that is not included in the discovery message or a public message.

Figure 4:
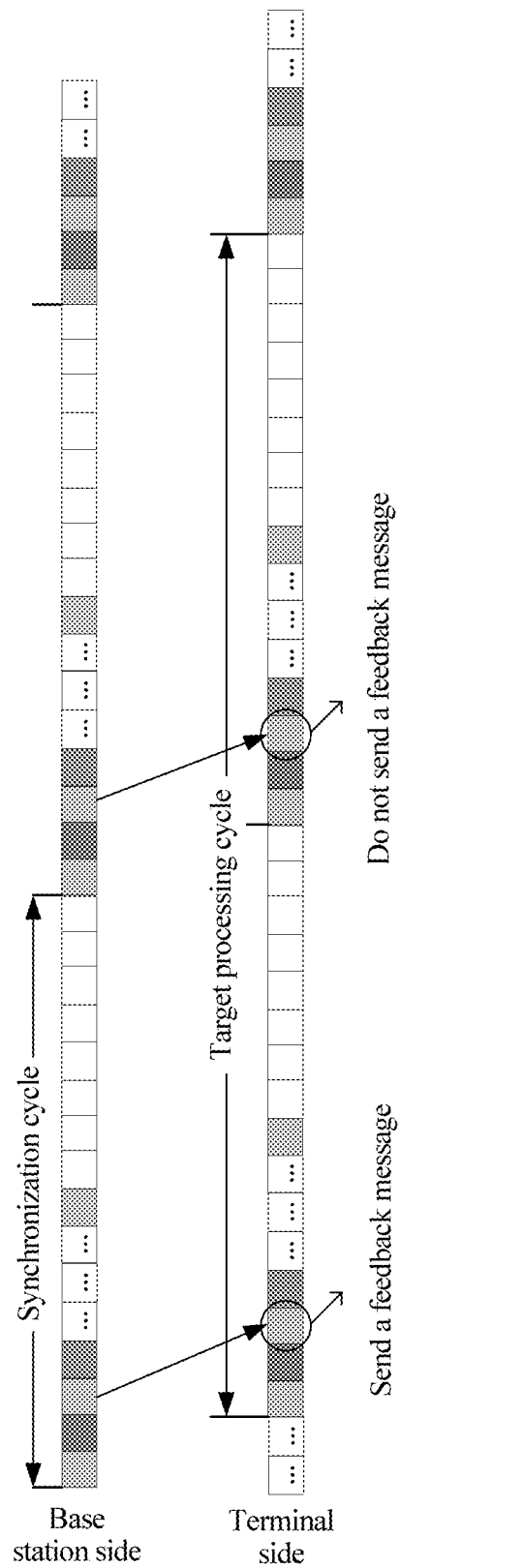
FIG. 4 is a schematic diagram of discovery message processing according to an embodiment of this disclosure.

In implementation, the second wireless network device may configure the target processing cycle for the first wireless network device, that is, set that the first wireless network device processes a discovery message of one cycle at an interval of multiple synchronization cycles, and the target processing cycle may be an integer multiple of the synchronization cycle. Further, the second wireless network device may generate the processing cycle configuration message, add the target synchronization cycle to the processing cycle configuration message, and then send the processing cycle configuration message to the first wireless network device. After receiving the foregoing processing cycle configuration message, the first wireless network device may obtain the target processing cycle carried in the processing cycle configuration message. Further, the first wireless network device may process a discovery message in only one synchronization cycle in each target processing cycle. As shown in FIG. 4, in the target processing cycle, the first wireless network device may send a feedback message corresponding to a discovery message in only one synchronization cycle to the second wireless network device. Preferably, for each target processing cycle, only a discovery message received in a first synchronization cycle may be processed.

In this way, the first wireless network device does not need to perform feedback for a discovery message in each synchronization cycle, and a feedback message received by the second wireless network device in each synchronization cycle can be accordingly reduced, so that processing resources of the first wireless network device and the second wireless network device can be saved.

Optionally, if the first wireless network device is in the RRC connected state or has the RRC connection requirement, the first wireless network device sends, in a preset normal feedback sub-period in a current synchronization cycle, the feedback message corresponding to the discovery message to the second wireless network device.

Figure 5:
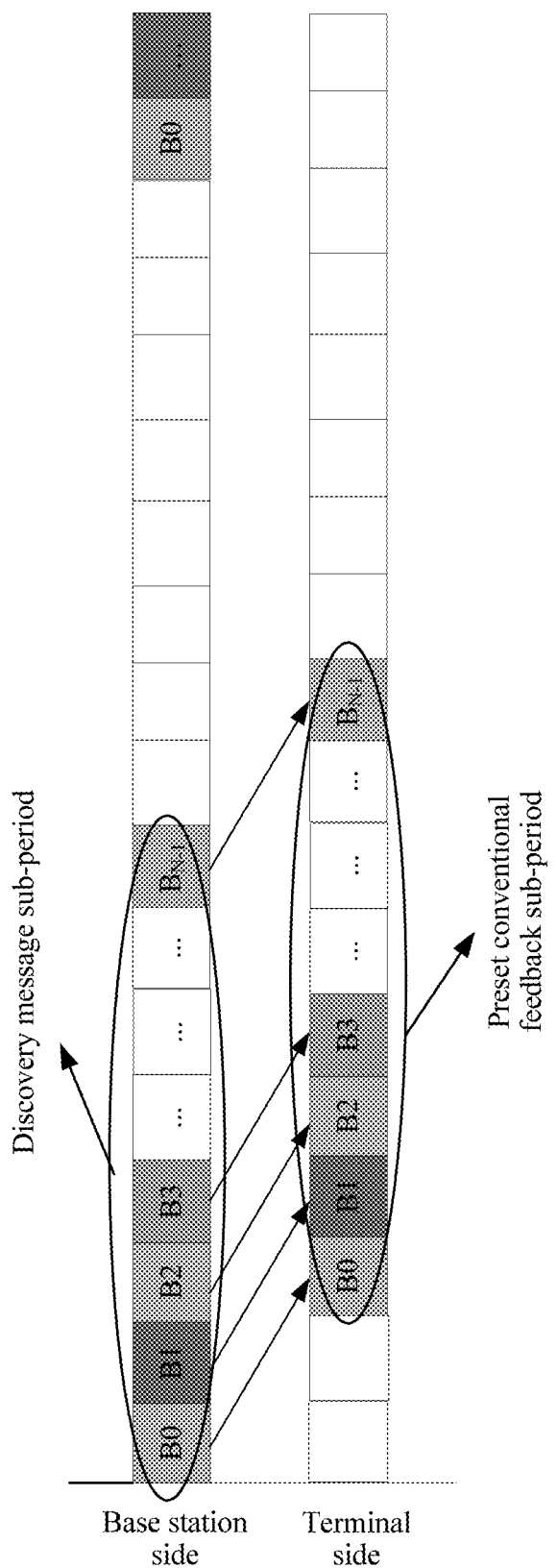
FIG. 5 is a schematic diagram of a preset normal feedback sub-period according to an embodiment of this disclosure.

In implementation, multiple normal feedback sub-periods may be set for the first wireless network device, so as to send the feedback message to the second wireless network device. In a correspondence between the time domain location information of the discovery message and the time domain location information of the feedback message, the time domain location information of the feedback message may be time domain location information of one normal feedback sub-period. If the first wireless network device is not in the RRC connected state or has no RRC connection requirement, the first wireless network device does not send the feedback message to the second wireless network device after receiving the discovery message. If the first wireless network device enters the RRC connected state or has the RRC connection requirement, the first wireless network device may obtain a current time. If the current time is before the preset normal feedback sub-period of the current synchronization cycle, the first wireless network device may send, to the second wireless network device in the preset normal feedback sub-period of the current synchronization cycle, a feedback message corresponding to a discovery message received in the current synchronization cycle; or if the current time is after the preset normal feedback sub-period of the current synchronization cycle, the first wireless network device may not perform feedback for the discovery message in the current synchronization cycle, and instead the first wireless network device sends, to the second wireless network device in a preset normal feedback sub-period of a next synchronization cycle, a feedback message corresponding to a discovery message received in the next synchronization cycle. As shown in FIG. 5, a preset normal feedback sub-period corresponding to each discovery message sub-period may be an Nth sub-period after the second wireless network device sends the discovery message, where N may be equal to 2.

Optionally, the second wireless network device may temporarily configure an additional feedback sub-period other than the preset normal feedback sub-period for the first wireless network device at any moment based on a time-frequency resource usage status, and the first wireless network device may accordingly perform the following processing: The first wireless network device receives a resource configuration message sent by the second wireless network device, where the resource configuration message carries an additional feedback sub-period in a synchronization cycle; and in the current synchronization cycle, if the first wireless network device enters the RRC connected state or has the RRC connection requirement, the first wireless network device sends, in a closest additional feedback sub-period after the first wireless network device enters the RRC connected state or has the RRC connection requirement, the feedback message corresponding to the discovery message to the second wireless network device.

Figure 6:
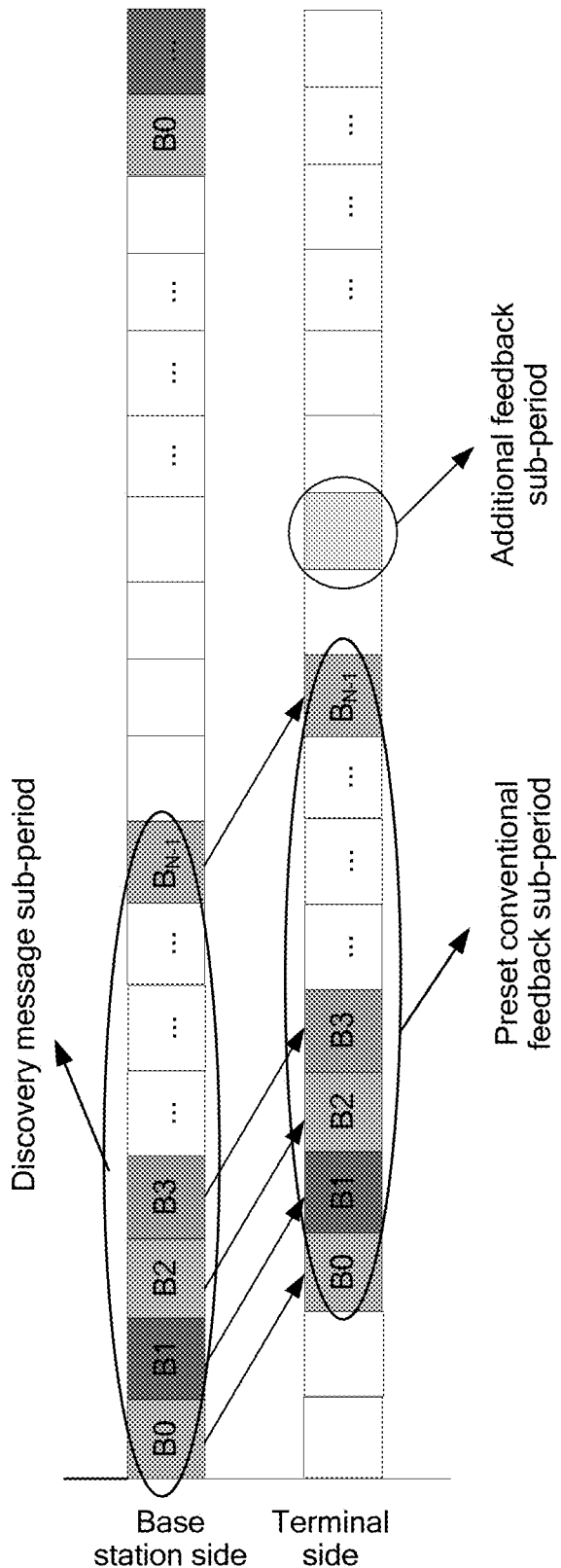
FIG. 6 is a schematic diagram of an additional feedback sub-period according to an embodiment of this disclosure.

In implementation, the second wireless network device may temporarily set a sub-period in the synchronization cycle to the additional feedback sub-period based on a time-frequency resource usage status, and send, to the first wireless network device, the resource configuration message carrying the additional feedback sub-period. After receiving the resource configuration message, the first wireless network device may obtain the additional feedback sub-period in the synchronization cycle carried in the resource configuration message, that is, temporarily configure a sub-period used for feedback message sending, and store the additional feedback sub-period. As shown in FIG. 6, if the first wireless network device is not in the RRC connected state or has no RRC connection requirement, the first wireless network device does not send the feedback message to the second wireless network device after receiving the discovery message. If the first wireless network device enters the RRC connected state or has the RRC connection requirement in a synchronization cycle, the first wireless network device may determine a closest additional feedback sub-period, in the current synchronization cycle, after the first wireless network device enters the RRC connected state or has the RRC connection requirement, and may send, in the additional feedback sub-period, the feedback message corresponding to the discovery message to the second wireless network device.

In this way, after entering the RRC connected state or having the RRC connection requirement, the first wireless network device may send the feedback message in the closest additional feedback sub-period without long-time waiting, so that a feedback delay of the first wireless network device can be reduced.

Optionally, the second wireless network device may preset an additional feedback sub-period other than the preset normal feedback sub-period, and corresponding processing may be as follows: In the current synchronization cycle, if the first wireless network device enters the RRC connected state or has the RRC connection requirement, the first wireless network device sends, in a closest preset additional feedback sub-period after the first wireless network device enters the RRC connected state or has the RRC connection requirement, the feedback message corresponding to the discovery message to the second wireless network device.

Figure 7:
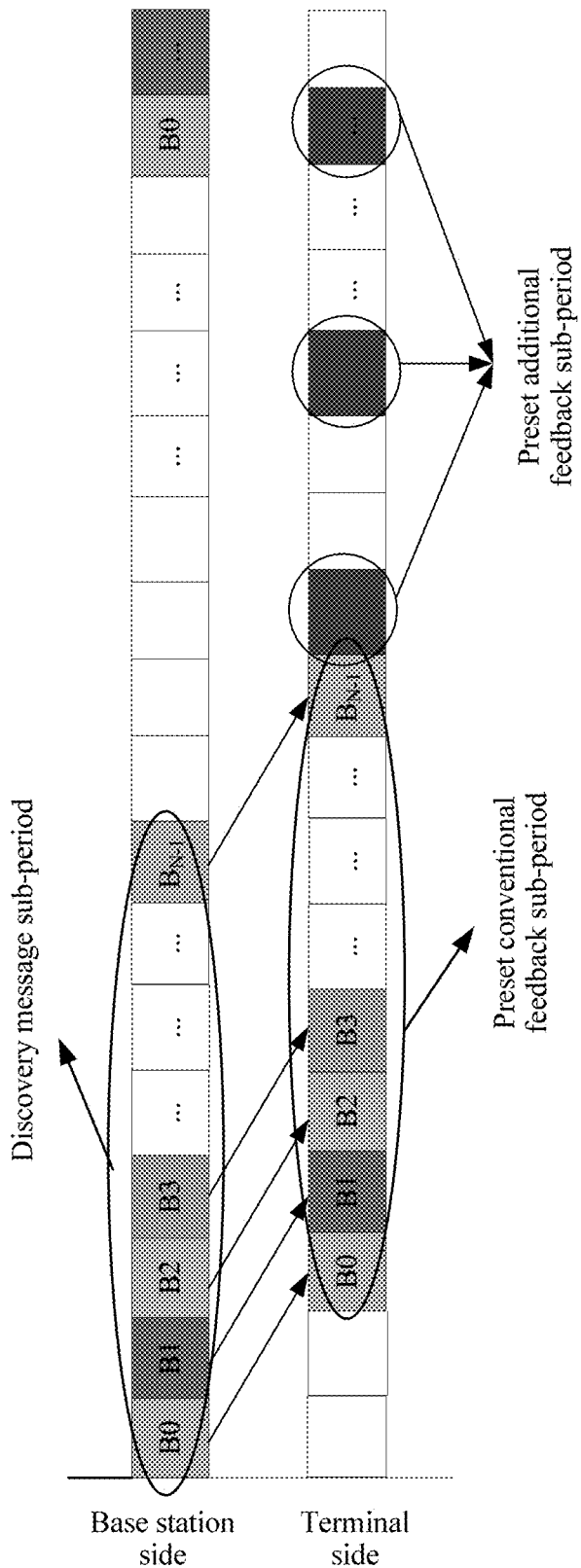
FIG. 7 is a schematic diagram of a preset additional feedback sub-period according to an embodiment of this disclosure.

In implementation, the second wireless network device may set a sub-period in the synchronization cycle other than the preset normal feedback sub-period to a preset additional feedback sub-period, and send, to the first wireless network device, a resource configuration message carrying the preset additional feedback sub-period. After receiving the resource configuration message, the first wireless network device may obtain the preset additional feedback sub-period in the synchronization cycle carried in the resource configuration message, that is, pre-configure a sub-period used for feedback message sending, and store the preset additional feedback sub-period. As shown in FIG. 7, if the first wireless network device is not in the RRC connected state or has no RRC connection requirement, the first wireless network device does not send the feedback message to the second wireless network device after receiving the discovery message. If the first wireless network device enters the RRC connected state or has the RRC connection requirement in a synchronization cycle, the first wireless network device may detect a preset additional feedback sub-period closest to a current moment in the current synchronization cycle, and send, in the preset additional feedback sub-period, the feedback message corresponding to the discovery message to the second wireless network device.

In this way, after entering the RRC connected state or having the RRC connection requirement, the first wireless network device may send the feedback message in the closest preset additional feedback sub-period without long-time waiting, so that a feedback delay of the first wireless network device can be reduced.

Optionally, when receiving the discovery message, the first wireless network device may obtain a received signal strength of the current discovery message. Further, processing in step 102 may be as follows: If the received signal strength is greater than or equal to a preset signal strength threshold, and the first wireless network device is in the RRC connected state or has the RRC connection requirement, the first wireless network device sends the feedback message corresponding to the discovery message to the second wireless network device.

In implementation, the first wireless network device may preset the signal strength threshold, so as to determine whether a cell or beam corresponding to a discovery signal has relatively good quality. When a signal strength of a received discovery message is greater than or equal to the signal strength threshold, the first wireless network device may query whether the first wireless network device is in the RRC connected state or has the RRC connection requirement. If the first wireless network device is in the RRC connected state or has the RRC connection requirement, the first wireless network device sends the feedback message corresponding to the discovery message to the second wireless network device. For a corresponding specific processing manner, refer to the foregoing content in this embodiment.

In this way, the first wireless network device performs feedback for only a discovery message with a relatively high received signal strength, and the second wireless network device may send a subsequent message to only a corresponding cell or beam according to the feedback message, so that a message subsequently received by the first wireless network device has a relatively high received signal strength, and processing resources of the first wireless network device and the second wireless network device can be saved.

Optionally, in a synchronization cycle, the first wireless network device may process only a discovery message with a highest signal strength, and corresponding processing may be as follows: The first wireless network device receives multiple discovery messages sent by the second wireless network device in a discovery message period of the current synchronization cycle; obtains a received signal strength of each discovery message; and if the multiple received discovery messages include a discovery message whose received signal strength is greater than or equal to the preset signal strength threshold, and the first wireless network device is in the RRC connected state or has the RRC connection requirement, sends a feedback message corresponding to a discovery message with a highest received signal strength to the second wireless network device.

Figure 8:
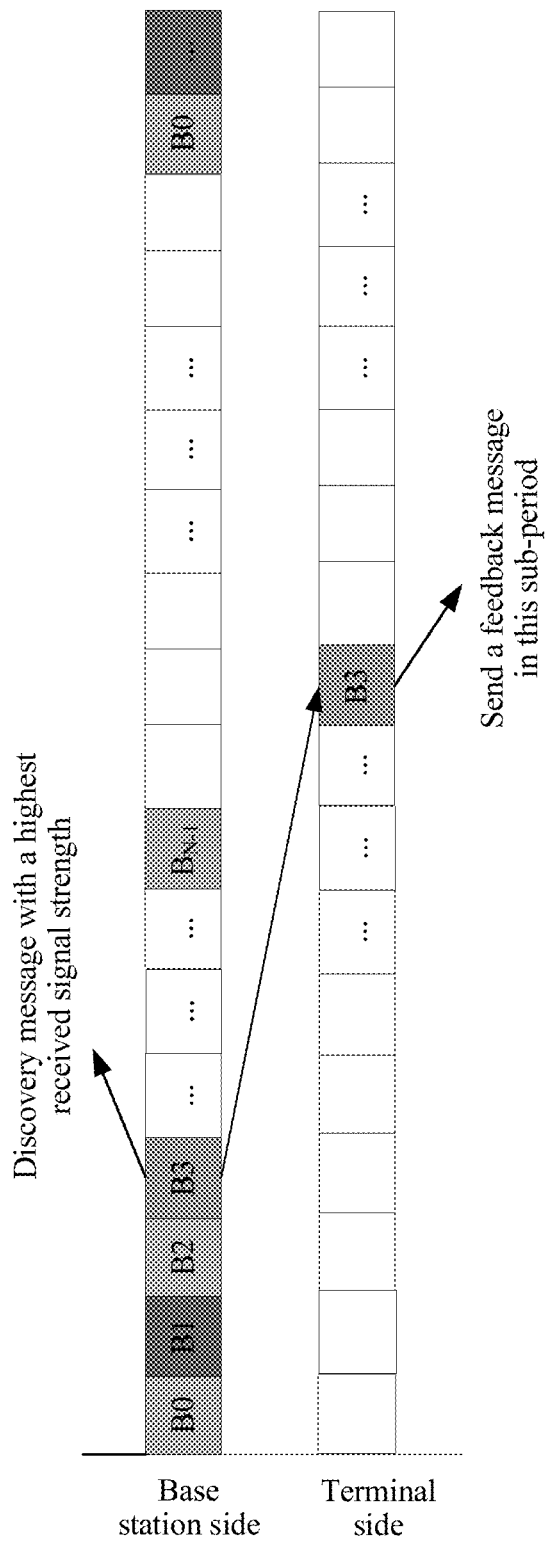
FIG. 8 is a schematic diagram of discovery message processing according to an embodiment of this disclosure.

In implementation, in a synchronization cycle, if receiving the multiple discovery messages, the first wireless network device may obtain corresponding received signal strengths for receiving these discovery messages. If the multiple received discovery messages include the discovery message whose received signal strength is greater than or equal to the signal strength threshold, it may be determined whether the first wireless network device is in the RRC connected state or has the RRC connection requirement. If the first wireless network device is in the RRC connected state or has the RRC connection requirement, the first wireless network device may select a discovery message with a highest received signal strength from the multiple received discovery messages, and then send, in a last preset normal feedback sub-period in the current synchronization cycle, the feedback message corresponding to the discovery message to the second wireless network device. That is, as shown in FIG. 8, if B3 corresponds to a discovery message with a highest received signal strength, a feedback message corresponding to B3 may be sent to the second wireless network device in the last preset normal feedback sub-period.

In this way, the first wireless network device needs to perform feedback for only one discovery message in each synchronization cycle, and the second wireless network device may send a subsequent message to only one corresponding cell or beam according to a feedback message, so that processing resources of the first wireless network device and the second wireless network device can be saved. In addition, the last preset normal feedback sub-period is selected to ensure that the first wireless network device can perform feedback for any discovery message.

Optionally, a corresponding feedback message can be sent only when the discovery message with a highest received signal strength changes relative to a discovery message with a highest received signal strength in a previous synchronization cycle, and corresponding processing may be as follows: If the multiple received discovery messages include the discovery message whose received signal strength is greater than or equal to the preset signal strength threshold, the first wireless network device is in the RRC connected state or has the RRC connection requirement, and a discovery message with a highest received signal strength in the current synchronization cycle is different from a discovery message with a highest received signal strength in a previous synchronization cycle, the first wireless network device sends, to the second wireless network device, a feedback message corresponding to the discovery message received in the current synchronization cycle.

In implementation, when the first wireless network device is in the RRC connected state or has the RRC connection requirement, if the first wireless network device detects, in a synchronization cycle, that the discovery message with a highest received signal strength in the current cycle is different from the discovery message with a highest received signal strength in the previous synchronization cycle (the difference herein indicates that identification information carried in the discovery messages is different, or time domain location information corresponding to the discovery messages is different, but other content of the discovery messages is the same), the first wireless network device may send, in a last preset normal feedback sub-period in the current synchronization cycle, a feedback message corresponding to the discovery message with a highest received signal strength to the second wireless network device. If the first wireless network device detects that the discovery message with a highest received signal strength in the current cycle is the same as the discovery message with a highest received signal strength in the previous synchronization cycle (the sameness herein indicates that identification information carried in the discovery messages is the same, or time domain location information corresponding to the discovery messages is the same, and other content of the discovery messages may be different), the first wireless network device may not send the feedback message to the second wireless network device in the current cycle.

In this way, when the cell or beam in which the first wireless network device is located changes, the second wireless network device may be notified in a timely manner, so that the second wireless network device can send a subsequent message to the first wireless network device in a new cell or beam. In addition, selecting the last preset normal feedback sub-period ensures that the first wireless network device can perform feedback for any discovery message.

Optionally, after sending the feedback message to the second wireless network device, the first wireless network device receives a public message that corresponds to the discovery message and that is sent by the second wireless network device.

The public message may include SIB (system information block) information.

In implementation, after the first wireless network device sends the feedback message to the second wireless network device, the second wireless network device may learn of, according to identification information carried in the feedback message or time domain location information of the feedback message, a cell or beam in which the first wireless network device is located, so as to determine a sub-period corresponding to the cell or beam in a public message period of the synchronization cycle, and send a corresponding public message in the sub-period. After receiving the public message sent by the second wireless network device, the first wireless network device may perform, according to the SIB information, operations such as public radio resource configuration, communications cell selection and reselection. Preferably, synchronization information may also be configured in the public message. In this way, after receiving the public message, the first wireless network device may perform time frequency synchronization processing with the second wireless network device, so that a network access delay of the first wireless network device is reduced.

In this embodiment of this disclosure, the first wireless network device receives the discovery message sent by the second wireless network device. If the first wireless network device is in the RRC connected state or has the RRC connection requirement, the first wireless network device sends the feedback message corresponding to the discovery message to the second wireless network device. In this way, the first wireless network device sends the feedback message to the second wireless network device only when the first wireless network device has a communications network access requirement, so that time-frequency resources can be saved. It can be learned based on the foregoing processing that the processing method is applied to high frequency communication. In a multi-carrier aggregation scenario, it may be set that the first wireless network device preferably camps on a low frequency cell. In this way, the first wireless network device has no RRC connection requirement for a high frequency cell, and does not need to send a feedback message, so that complexity of processing the high frequency cell can be reduced.

Based on a same concept, an embodiment of this disclosure further provides a wireless network device. As shown in FIG. 14, a terminal device provided in this embodiment may implement a procedure of the embodiment shown in FIG. 1 of this disclosure. The wireless network device includes a receiver 1410, a processor 1420, and a transmitter 1430.

The receiver 1410 is configured to receive a discovery message sent by a second wireless network device.

The processor 1420 is configured to: if a first wireless network device is in an RRC connected state or has an RRC connection requirement, trigger the transmitter 1430 to send a feedback message corresponding to the discovery message to the second wireless network device.

In implementation, the second wireless network device may send, in a discovery message period of each synchronization cycle in a beam manner according to a preset synchronization cycle, a discovery message to each cell or beam served by the second wireless network device. If the first wireless network device is in signal coverage of the second wireless network device, and the receiver 1410 can continuously receive a signal, the receiver 1410 may search for and receive a discovery message that is broadcast by the second wireless network device to the outside. If determining that the first wireless network device is in an RRC connected state or has an RRC connection requirement, the processor 1420 may trigger the transmitter 1430 to send the feedback message to the second wireless network device in a sub-period in which an uplink resource is configured in a current synchronization cycle, so that the second wireless network device learns that the first wireless network device in the RRC connected state or having the RRC connection requirement exists in a direction corresponding to a beam in which the discovery message is located, that is, learns that a public message sending requirement exists in the direction in which the beam is located. In addition, if the processor 1420 determines that the first wireless network device is not in the RRC connected state or has no RRC connection requirement, the transmitter 1430 does not send the feedback message corresponding to the discovery message to the second wireless network device.

Optionally, the receiver 1410 is specifically configured to: receive the discovery message sent by the second wireless network device; and trigger the processor 1420 to obtain identification information carried in the discovery message or time domain location information of the discovery message.

The processor 1420 is specifically configured to: if the first wireless network device is in the RRC connected state or has the RRC connection requirement, trigger the transmitter 1430 to send, to the second wireless network device, a feedback message carrying the identification information; or the processor 1420 is specifically configured to: if the first wireless network device is in the RRC connected state or has the RRC connection requirement, trigger the transmitter 1430 to send a feedback message corresponding to the time domain location information to the second wireless network device.

In implementation, if determining that the first wireless network device is in the RRC connected state or has the RRC connection requirement, and successfully receives the discovery message, the processor 1420 may determine a sequence of the feedback message or a feedback sub-period of the feedback message according to the identification information or the time domain location information of the discovery message, so as to generate the feedback message corresponding to the discovery message. Then the transmitter 1430 may send the feedback message to the second wireless network device in the sub-period in which an uplink resource is configured in the current synchronization cycle.

Optionally, the receiver 1410 is further configured to receive a processing cycle configuration message sent by the second wireless network device.

The processor 1420 is further configured to set that the first wireless network device processes, only once in each target processing cycle, a discovery message received in a synchronization cycle.

In implementation, the second wireless network device may configure the target processing cycle for the first wireless network device, that is, set that the first wireless network device processes a discovery message of one cycle at an interval of multiple synchronization cycles, and the target processing cycle may be an integer multiple of the synchronization cycle. Further, the second wireless network device may generate the processing cycle configuration message, add the target synchronization cycle to the processing cycle configuration message, and then send the processing cycle configuration message to the first wireless network device. After the receiver 1410 receives the foregoing processing cycle configuration message, the processor 1420 may obtain the target processing cycle carried in the processing cycle configuration message. Further, the processor 1420 may process a discovery message in only one synchronization cycle in each target processing cycle.

Optionally, the processor 1420 is specifically configured to: if the first wireless network device is in the RRC connected state or has the RRC connection requirement, trigger the transmitter 1430 to send, in a preset normal feedback sub-period in a current synchronization cycle, the feedback message corresponding to the discovery message to the second wireless network device.

In implementation, if the processor 1420 determines that the first wireless network device is not in the RRC connected state or has no RRC connection requirement, the transmitter 1430 does not send the feedback message to the second wireless network device after the receiver 1410 receives the discovery message. If determining that the first wireless network device enters the RRC connected state or has the RRC connection requirement, the processor 1420 triggers, in the preset normal feedback sub-period in the current synchronization cycle, the transmitter 1430 to send the feedback message corresponding to the discovery message to the second wireless network device.

Optionally, the receiver 1410 is further configured to receive a resource configuration message sent by the second wireless network device.

The processor 1420 is specifically configured to: in the current synchronization cycle, if the first wireless network device enters the RRC connected state or has the RRC connection requirement, trigger the transmitter 1430 to send, in a closest additional feedback sub-period after the first wireless network device enters the RRC connected state or has the RRC connection requirement, the feedback message corresponding to the discovery message to the second wireless network device.

In implementation, the second wireless network device may temporarily set a sub-period in the synchronization cycle to the additional feedback sub-period based on a time-frequency resource usage status, and send, to the first wireless network device, the resource configuration message carrying the additional feedback sub-period. After the receiver 1410 receives the resource configuration message, the processor 1420 may obtain the additional feedback sub-period in the synchronization cycle carried in the resource configuration message, and store the additional feedback sub-period. If the processor 1420 determines that the first wireless network device is not in the RRC connected state or has no RRC connection requirement, the transmitter 1430 does not send the feedback message to the second wireless network device after the receiver 1410 receives the discovery message. If the first wireless network device enters the RRC connected state or has the RRC connection requirement in a synchronization cycle, the processor 1420 may determine a closest additional feedback sub-period in the current synchronization cycle after the first wireless network device enters the RRC connected state or has the RRC connection requirement, and the transmitter 1430 may send, in the additional feedback sub-period, the feedback message corresponding to the discovery message to the second wireless network device.

Optionally, the processor 1420 is further configured to: in the current synchronization cycle, if the first wireless network device enters the RRC connected state or has the RRC connection requirement, trigger the transmitter 1430 to send, in a closest preset additional feedback sub-period after the first wireless network device enters the RRC connected state or has the RRC connection requirement, the feedback message corresponding to the discovery message to the second wireless network device.

In implementation, the second wireless network device may set a sub-period in the synchronization cycle other than the preset normal feedback sub-period to a preset additional feedback sub-period, and send, to the first wireless network device, a resource configuration message carrying the preset additional feedback sub-period. After the receiver 1410 receives the resource configuration message, the processor 1420 may obtain the preset additional feedback sub-period in the synchronization cycle carried in the resource configuration message, that is, pre-configure a sub-period used for feedback message sending, and store the preset additional feedback sub-period. If the processor 1420 determines that the first wireless network device is not in the RRC connected state or has no RRC connection requirement, the transmitter 1430 does not send the feedback message to the second wireless network device after the receiver 1410 receives the discovery message. If the first wireless network device enters the RRC connected state or has the RRC connection requirement in a synchronization cycle, the processor 1420 may detect the preset additional feedback sub-period closest to a current moment in the current synchronization cycle, and the transmitter 1430 may send, in the preset additional feedback sub-period, the feedback message corresponding to the discovery message to the second wireless network device.

Optionally, the processor 1420 is further configured to obtain a received signal strength of the discovery message; and if the received signal strength is greater than or equal to a preset signal strength threshold, and the first wireless network device is in the RRC connected state or has the RRC connection requirement, trigger the transmitter 1430 to send the feedback message corresponding to the discovery message to the second wireless network device.

In implementation, the processor 1420 may preset the signal strength threshold, so as to determine whether a cell or beam corresponding to a discovery signal has relatively good signal quality. When a signal strength of a discovery message received by the receiver 1410 is greater than or equal to the signal strength threshold, the processor 1420 may query whether the first wireless network device is in the RRC connected state or has the RRC connection requirement. If the first wireless network device is in the RRC connected state or has the RRC connection requirement, the transmitter 1430 sends the feedback message corresponding to the discovery message to the second wireless network device.

Optionally, the receiver 1410 is specifically configured to receive multiple discovery messages sent by the second wireless network device in a discovery message period of the current synchronization cycle.

The processor 1420 is specifically configured to: obtain a received signal strength of each discovery message; and if the multiple received discovery messages include a discovery message whose received signal strength is greater than or equal to the preset signal strength threshold, and the first wireless network device is in the RRC connected state or has the RRC connection requirement, trigger the transmitter 1430 to send a feedback message corresponding to a discovery message with a highest received signal strength to the second wireless network device.

In implementation, in a synchronization cycle, if the receiver 1410 receives the multiple discovery messages, the processor 1420 may obtain corresponding received signal strengths for receiving the discovery messages. If the multiple discovery messages received by the receiver 1410 include the discovery message whose received signal strength is greater than or equal to the signal strength threshold, the processor 1420 may determine whether the first wireless network device is in the RRC connected state or has the RRC connection requirement. If determining that the first wireless network device is in the RRC connected state or has the RRC connection requirement, the processor 1420 may select a discovery message with a highest received signal strength from the multiple received discovery messages. Then the transmitter 1430 may send, in a last preset normal feedback sub-period in the current synchronization cycle, the feedback message corresponding to the discovery message to the second wireless network device.

Optionally, the processor 1420 is specifically configured to: if the multiple received discovery messages include the discovery message whose received signal strength is greater than or equal to the preset signal strength threshold, the first wireless network device is in the RRC connected state or has the RRC connection requirement, and a discovery message with a highest received signal strength in the current synchronization cycle is different from a discovery message with a highest received signal strength in a previous synchronization cycle, trigger the transmitter 1430 to send, to the second wireless network device, a feedback message corresponding to the discovery message received in the current synchronization cycle.

In implementation, when the first wireless network device is in the RRC connected state or has the RRC connection requirement, if the processor 1420 detects, in a synchronization cycle, that the discovery message with a highest received signal strength in the current cycle is different from the discovery message with a highest received signal strength in the previous synchronization cycle, the transmitter 1430 may send, in a last preset normal feedback sub-period in the current synchronization cycle, a feedback message corresponding to the discovery message with a highest received signal strength to the second wireless network device. If the processor 1420 detects that the discovery message with a highest received signal strength in the current cycle is the same as the discovery message with a highest received signal strength in the previous synchronization cycle, the transmitter 1430 may not send the feedback message to the second wireless network device in the current cycle.

Optionally, the receiver 1410 is further configured to receive a public message that corresponds to the discovery message and that is sent by the second wireless network device.

In implementation, after the transmitter 1430 sends the feedback message to the second wireless network device, the second wireless network device may learn of, according to identification information carried in the feedback message or time domain location information of the feedback message, a cell or beam in which the first wireless network device is located, so as to determine a sub-period corresponding to the cell or beam in a public message period of the synchronization cycle, and send a corresponding public message in the sub-period. After receiving the public message sent by the second wireless network device, the receiver 1410 may perform, according to SIB information, operations such as public radio resource configuration, communications cell selection and reselection.

In this embodiment of this disclosure, the first wireless network device receives the discovery message sent by the second wireless network device. If the first wireless network device is in the RRC connected state or has the RRC connection requirement, the first wireless network device sends the feedback message corresponding to the discovery message to the second wireless network device. In this way, the first wireless network device sends the feedback message to the second wireless network device only when the first wireless network device has a communications network access requirement, so that time-frequency resources can be saved.

Figure 9:
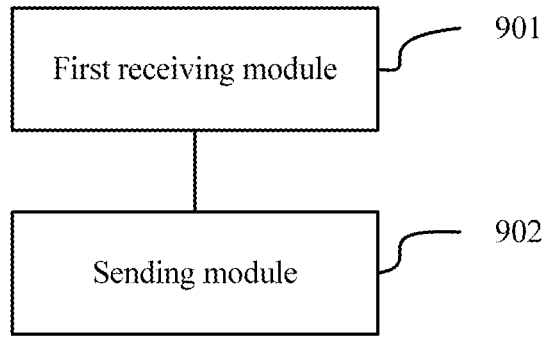
FIG. 9 is a schematic structural diagram of a discovery message processing apparatus according to an embodiment of this disclosure.

Based on a same technical concept, an embodiment of this disclosure further provides a discovery message processing apparatus. As shown in FIG. 9, the apparatus includes:

a first receiving module 901 whose specific function may be implemented by a receiver 1410, configured to receive a discovery message sent by a second wireless network device; and a sending module 902 whose specific function may be jointly implemented by a processor 1420 and a transmitter 1430, configured to: if the first wireless network device is in an RRC connected state or has an RRC connection requirement, send a feedback message corresponding to the discovery message to the second wireless network device.

Optionally, the first receiving module 901 is configured to:

receive the discovery message sent by the second wireless network device; and obtain identification information carried in the discovery message or time domain location information of the discovery message.

The sending module 902 is configured to:

if the first wireless network device is in the RRC connected state or has the RRC connection requirement, send, to the second wireless network device, a feedback message carrying the identification information; or if the first wireless network device is in the RRC connected state or has the RRC connection requirement, send a feedback message corresponding to the time domain location information to the second wireless network device.

Figure 10:
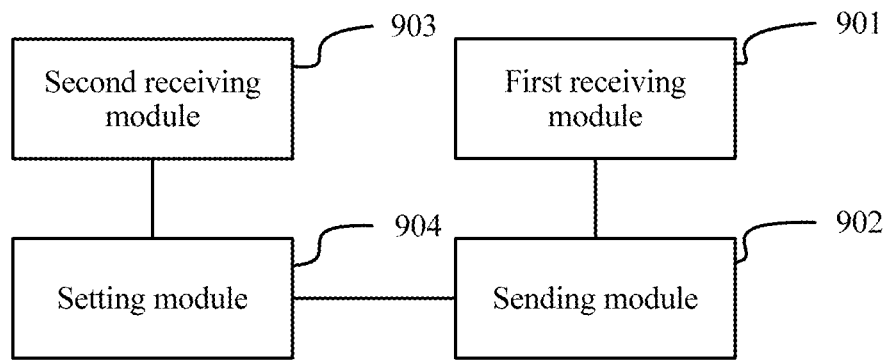
FIG. 10 is a schematic structural diagram of a discovery message processing apparatus according to an embodiment of this disclosure.

Optionally, as shown in FIG. 10, the apparatus further includes:

a second receiving module 903 whose specific function may be implemented by the receiver 1410, configured to receive a processing cycle configuration message sent by the second wireless network device, where the processing cycle configuration message carries a target processing cycle, and the target processing cycle is an integer multiple of a synchronization cycle; and a setting module 904 whose specific function may be implemented by the processor 1420, configured to set that the first wireless network device processes, only once in each target processing cycle, a discovery message received in a synchronization cycle.

Optionally, the sending module 902 is configured to:

if the first wireless network device is in the RRC connected state or has the RRC connection requirement, send, in a preset normal feedback sub-period in a current synchronization cycle, the feedback message corresponding to the discovery message to the second wireless network device.

Figure 11:
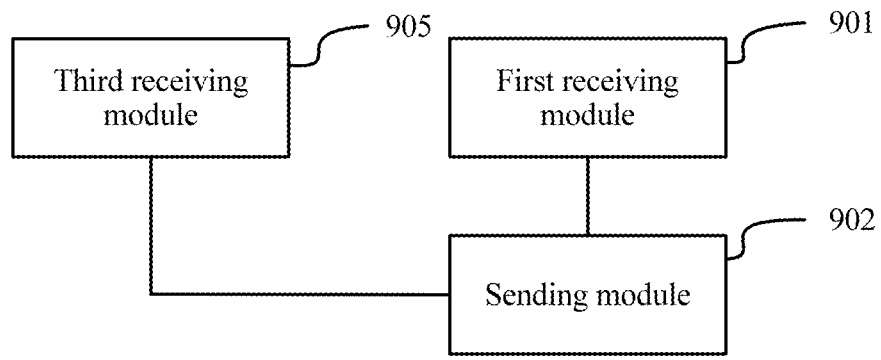
FIG. 11 is a schematic structural diagram of a discovery message processing apparatus according to an embodiment of this disclosure.

Optionally, as shown in FIG. 11, the apparatus further includes a third receiving module 905 whose specific function may be implemented by the receiver 1410, configured to receive a resource configuration message sent by the second wireless network device, where the resource configuration message carries an additional feedback sub-period in a synchronization cycle.

The sending module 902 is configured to: in the current synchronization cycle, if the first wireless network device enters the RRC connected state or has the RRC connection requirement, send, in a closest additional feedback sub-period after the first wireless network device enters the RRC connected state or has the RRC connection requirement, the feedback message corresponding to the discovery message to the second wireless network device.

Optionally, the sending module 902 is further configured to:

in the current synchronization cycle, if the first wireless network device enters the RRC connected state or has the RRC connection requirement, send, in a closest preset additional feedback sub-period after the first wireless network device enters the RRC connected state or has the RRC connection requirement, the feedback message corresponding to the discovery message to the second wireless network device.

Figure 12:
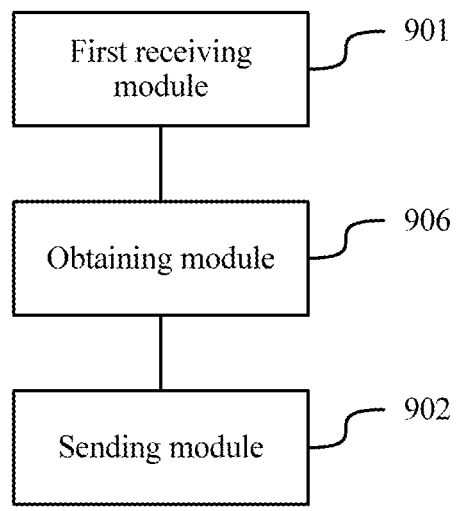
FIG. 12 is a schematic structural diagram of a discovery message processing apparatus according to an embodiment of this disclosure.

Optionally, as shown in FIG. 12, the apparatus further includes an obtaining module 906 whose specific function may be implemented by the processor 1420, configured to obtain a received signal strength of the discovery message.

The sending module 902 is configured to: if the received signal strength is greater than a preset signal strength threshold, and the first wireless network device is in the RRC connected state or has the RRC connection requirement, send the feedback message corresponding to the discovery message to the second wireless network device.

Optionally, the first receiving module 901 is configured to receive multiple discovery messages sent by the second wireless network device in a discovery message period of the current synchronization cycle.

The obtaining module 906 is configured to obtain a received signal strength of each discovery message.

The sending module 902 is configured to: if the multiple received discovery messages include a discovery message whose received signal strength is greater than the preset signal strength threshold, and the first wireless network device is in the RRC connected state or has the RRC connection requirement, send a feedback message corresponding to a discovery message with a highest received signal strength to the second wireless network device.

Optionally, the sending module 902 is configured to:

if the multiple received discovery messages include the discovery message whose received signal strength is greater than the preset signal strength threshold, the first wireless network device is in the RRC connected state or has the RRC connection requirement, and a discovery message with a highest received signal strength in the current synchronization cycle is different from a discovery message with a highest received signal strength in a previous synchronization cycle, send, to the second wireless network device, a feedback message corresponding to the discovery message received in the current synchronization cycle.

Figure 13:
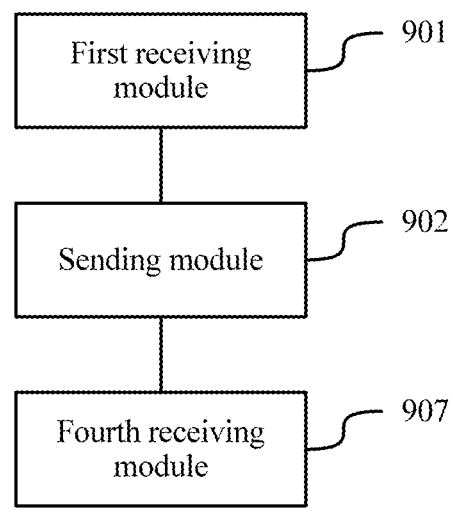
FIG. 13 is a schematic structural diagram of a discovery message processing apparatus according to an embodiment of this disclosure.

Optionally, as shown in FIG. 13, the apparatus further includes:

a fourth receiving module 907 whose specific function may be implemented by the receiver 1410, configured to receive a public message that corresponds to the discovery message and that is sent by the second wireless network device.

In this embodiment of this disclosure, the first wireless network device receives the discovery message sent by the second wireless network device. If the first wireless network device is in the RRC connected state or has the RRC connection requirement, the first wireless network device sends the feedback message corresponding to the discovery message to the second wireless network device. In this way, the first wireless network device sends the feedback message to the second wireless network device only when the first wireless network device has a communications network access requirement, so that time-frequency resources can be saved.

It should be noted that when the discovery message processing apparatus provided in the foregoing embodiment processes the discovery message, division of the foregoing function modules is merely used as an example for illustration. In actual application, the foregoing functions can be allocated to different function modules for implementation according to a requirement, that is, an internal structure of the first wireless network device is divided into different function modules to implement all or apart of the functions described above. In addition, the discovery message processing apparatus and the discovery message processing method that are provided in the foregoing embodiments pertain to a same concept. For a specific implementation process, refer to the method embodiments, and details are not repeatedly described herein.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely preferred embodiments of this disclosure, but are not intended to limit this disclosure. Any modification, equivalent replacement, or improvement made without departing from the spirit and principle of this disclosure should fall within the protection scope of this disclosure.

What is claimed is:

1. A discovery message processing method, comprising:
   receiving, by a first wireless network device, a first set of discovery messages from a second wireless network device during a first synchronization cycle; and
   sending, by the first wireless network device, a first feedback message to the second wireless network device when the first wireless network device is in an RRC connected state or has an RRC connection requirement, wherein the first feedback message corresponds to a first discovery message highest a signal strength among the first set of discovery messages received from the second wireless network device;
   receiving, by the first wireless network device, a second set of discovery messages from the second wireless network device during a second synchronization cycle;
   determining, by the first wireless network device, whether to send the second wireless network device a second feedback message corresponding to a second discovery message that has a highest signal strength among the second set of multiple discovery messages; and
   sending, by the first wireless network device, the second feedback message to the second wireless network device only when:
   the first wireless network device is in the RRC connected state or has the RRC connection requirement; and the second discovery message is different than the first discovery message.

2. The method according to claim 1, further comprising:
obtaining, by the first wireless device, identification information carried in the first discovery message or time domain location information of the first discovery message, and wherein sending, by the first wireless network device, the first feedback message corresponding to the first discovery message to the second wireless network device comprises either;
sending, by the first wireless network device to the second wireless network device, the first feedback message carrying the identification information, or
sending, by the first wireless network device to the second wireless device, the first feedback message corresponding to the time domain location information.

3. The method according to claim 1, further comprising:
receiving, by the first wireless network device, a processing cycle configuration message sent by the second wireless network device, wherein the processing cycle configuration message carries a target processing cycle that is an integer multiple of synchronization cycles; and
setting the first wireless network device to process, only once in each target processing cycle, a single discovery message received per synchronization cycle such that the first wireless network device does send a feedback message in each synchronization cycle.

4. The method according to claim 1, wherein sending, by the first wireless network device, the first feedback message corresponding to the first discovery message to the second wireless network device comprises sending, by the first wireless network device in a preset normal feedback sub-period in a current synchronization cycle, the first feedback message corresponding to the first discovery message to the second wireless network device.

5. The method according to claim 1, further comprising:
receiving, by the first wireless network device, a resource configuration message from the second wireless network device, wherein the resource configuration message carries an additional feedback sub-period in a synchronization cycle; and
in a current synchronization cycle, when the first wireless network device enters the RRC connected state or has the RRC connection requirement, sending, by the first wireless device in a closest additional feedback sub-period after the first wireless network device enters the RRC connected state or has the RRC connection requirement, the second wireless network device a feedback message corresponding to a discovery message received from the second wireless network device during the current synchronization cycle.

6. The method according to claim 1, further comprising:
in a current synchronization cycle, when the first wireless network device enters the RRC connected state or has the RRC connection requirement, sending, by the first wireless network device in a closest preset additional feedback sub-period after the first wireless network device enters the RRC connected state or has the RRC connection requirement, the second wireless network device a feedback message corresponding to a discovery message received from the second wireless network device during the current synchronization cycle.

7. The method according to claim 1, further comprising:
obtaining, by the first wireless network device, a received signal strength of a discovery message; and
sending, by the first wireless device, a feedback message corresponding to the discover message to the second wireless network device when the received signal strength is greater than or equal to a preset signal strength threshold and when the first wireless network device is in the RRC connected state or has the RRC connection requirement.

8. The method according to claim 1, further comprising:
receiving, by the first wireless network device, multiple discovery messages from the second wireless network device in a discovery message period of a current synchronization cycle;
obtaining, by the first wireless network device, a received signal strength of each of the multiple discovery messages; and
sending, by the first wireless network device, the feedback message corresponding to the discovery message to the second wireless network device when the received signal strength is greater than or equal to a preset signal strength threshold and when the first wireless network device is in the RRC connected state or has the RRC connection requirement,
wherein the first wireless network device sends the feedback message corresponding to the discovery message whose received signal strength is highest among the multiple discovery messages received from the second wireless network device, and wherein the first wireless network device does not send feedback messages corresponding to other discover messages among the multiple discovery messages received in the discovery message period of the current synchronization cycle.

9. The method according to claim 1, wherein after sending, by the first wireless network device, the first feedback message corresponding to the first discovery message to the second wireless network device, the method further comprises receiving, by the first wireless network device, a public message that corresponds to the first discovery message from the second wireless network device.

10. The method according to claim 1, wherein the first wireless network device does not send feedback messages corresponding to discovery messages in the first set of discovery messages other than the first feedback message corresponding to the first discovery message having the highest signal strength, and wherein the first wireless network device does not send the second feedback message to the second wireless network device when information carried in the second discovery message is the same as information carried in the first discovery message.

11. The method according to claim 10, wherein the information carried in at least one of the first or second discovery messages comprises identification information or time domain location information.

12. The method according to claim 1, wherein the second synchronization cycle comprises a period having multiple sub-periods, and wherein when the first wireless network device sends the second feedback message to the second wireless network device, the first wireless network device sends the second feedback message in a last sub-period in the period of the second synchronization cycle.

13. A wireless network device, comprising:
a transmitter,
a receiver configured to receive a first set of discovery messages from a second wireless network device during a first synchronization cycle; and
a processor coupled to the receiver and transmitter and configured to trigger the transmitter to send a first feedback message to the second wireless network device when a first wireless network device is in a Radio Resource Control (RRC) connected state or has an RRC connection requirement, wherein the first feedback message corresponds to a first discovery message that has a highest signal strength among the first set of discovery messages, wherein the receiver is further configured to receive a second set of discovery messages from the second wireless network device during a second synchronization cycle, and wherein the processor is further configured to:
determine whether to send the second wireless network device a second feedback message corresponding to a second discovery message that has a highest signal strength among the second set of multiple discovery messages; and trigger the transmitter to send the second feedback message to the second wireless network device when:
the first wireless network device is in the RRC connected state or has the RRC connection requirement; and
the second discovery message is different than the first discovery message.

14. The wireless network device according to claim 13, wherein the receiver is further configured to:
receive the first and second sets of discovery messages from the second wireless network device; and
trigger the processor to obtain identification information carried in the first and second discovery messages or time domain location information of the first and second discovery messages; and
wherein the processor is configured such that:
when the first wireless network device is in the RRC connected state or has the RRC connection requirement, the processor triggers the transmitter to send, to the second wireless network device, a feedback message carrying the identification information; or
when the first wireless network device is in the RRC connected state or has the RRC connection requirement, the processor triggers the transmitter to send a feedback message corresponding to the time domain location information to the second wireless network device.

15. The wireless network device according to claim 13, wherein the receiver is further configured to receive a processing cycle configuration message from the second wireless network device; and
wherein the processor is further configured to set the first wireless network device to process, only once in each target processing cycle, a discovery message received in a synchronization cycle.

16. The wireless network device according to claim 13, wherein the processor is configured such that when the first wireless network device is in the RRC connected state or has the RRC connection requirement, the processor triggers the transmitter to send, in a preset normal feedback sub-period in a current synchronization cycle, the second wireless network device a feedback message corresponding to a discovery message received from second wireless network device during the current synchronization cycle.

17. The wireless network device according to claim 13, wherein the receiver is further configured to receive a resource configuration message sent by the second wireless network device, and
wherein the processor is configured such that in a current synchronization cycle where the first wireless network device enters the RRC connected state or has the RRC connection requirement, the processor triggers the transmitter to send, in a closest additional feedback sub-period after the first wireless network device enters the RRC connected state or has the RRC connection requirement, the second wireless network device a feedback message corresponding to a discovery message received from the second wireless network device during the current synchronization cycle.

18. The wireless network device according to claim 13, wherein the processor is further configured such that in a current synchronization cycle where the first wireless network device enters the RRC connected state or has the RRC connection requirement, trigger the transmitter to send, in a closest preset additional feedback sub-period after the first wireless network device enters the RRC connected state or has the RRC connection requirement, the second wireless network device a feedback message corresponding to a discovery message received from the second wireless network device during the current synchronization cycle.

19. The wireless network device according to claim 13, wherein the processor is further configured to:
trigger the first wireless network device to obtain a received signal strength of a discovery message; and
trigger the transmitter to send a feedback message corresponding to the discovery message to the second wireless network device when the received signal strength is greater than or equal to a preset signal strength threshold and when the first wireless network device is in the RRC connected state or has the RRC connection requirement.

20. The wireless network device according to claim 13, wherein the receiver is configured to receive multiple discovery messages sent by the second wireless network device in a discovery message period of a current synchronization cycle and wherein the processor is configured to:
obtain a received signal strength of each of the multiple discovery messages, and
when the multiple received discovery messages comprise a discovery message whose received signal strength is highest among the multiple discovery messages received from the second wireless network device, the processor prevents the transmitter from sending a feedback message corresponding to the discovery message when information carried in the discover message is the same as information carried in another discovery message received in a synchronization cycle preceding the current synchronization cycle.

21. The wireless network device according to claim 13, wherein the receiver is further configured to receive a public message that corresponds to the first discovery message from the second wireless network device.

* * * * *

UNITED STATES PATENT AND TRADEMARK OFFICE
CERTIFICATE OF CORRECTION

PATENT NO. : 10,609,630 B2
APPLICATION NO. : 15/976642
DATED : March 31, 2020
INVENTOR(S) : Ting Wang, Yuanjie Li and Jian Zhang It is certified that error appears in the above-identified patent and that said Letters Patent is hereby corrected as shown below:

In the Claims

Claim 2, Column 29, Line 10: "comprises either;" should read "comprises either:"

Claim 8, Column 30, Line 29: "other discover messages among" should read "other discovery messages among"

Claim 20, Column 32, Line 52: "in the discover message is" should read "in the discovery message is"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*